(12) United States Patent
Hamerski et al.

(10) Patent No.: US 10,381,949 B2
(45) Date of Patent: Aug. 13, 2019

(54) POWER CONVERTER WITH REDUCED POWER LOSS

(71) Applicant: Bayerische Motoren Werke Aktiengesellschaft, Munich (DE)

(72) Inventors: Roman Hamerski, Unterhaching (DE); Carsten Riefle, Zorneding (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/050,636

(22) Filed: Jul. 31, 2018

(65) Prior Publication Data

US 2018/0342961 A1    Nov. 29, 2018

Related U.S. Application Data

(63) Continuation of application No. PCT/EP2017/051703, filed on Jan. 27, 2017.

(30) Foreign Application Priority Data

Feb. 1, 2016  (DE) .................. 10 2016 201 504

(51) Int. Cl.
*H02M 7/219* (2006.01)
*H02M 1/088* (2006.01)
(Continued)

(52) U.S. Cl.
CPC .......... *H02M 7/219* (2013.01); *H02M 1/088* (2013.01); *H02M 7/23* (2013.01); *H02M 7/493* (2013.01); *H02M 7/5387* (2013.01)

(58) Field of Classification Search
CPC ...... H02M 1/088; H02M 1/096; H02M 7/219; H02M 7/23; H02M 7/493; H02M 7/5387; H02M 7/53971
See application file for complete search history.

(56) References Cited

U.S. PATENT DOCUMENTS 6,285,572 B1    9/2001  Onizuka et al.
9,479,083 B2 *  10/2016 Makita ................ H02M 7/5387
(Continued)

FOREIGN PATENT DOCUMENTS

DE        40 05 168 A1    8/1991
DE        693 15 903 T2   8/1998
(Continued)

OTHER PUBLICATIONS

International Search Report (PCT/ISA/210) issued in PCT Application No. PCT/EP2017/051703 dated Jun. 14, 2017 with English translation (four (4) pages).
(Continued)

*Primary Examiner* — Matthew V Nguyen
(74) *Attorney, Agent, or Firm* — Crowell & Moring LLP

(57) ABSTRACT

A power converter including a bridge circuit is provided. The power converter is designed to convert a direct current of a current source into an alternating current and/or an alternating current into a direct current. The bridge circuit includes a first parallel circuit assembly, which is coupled to a higher potential of the current source and which has a plurality of switching elements connected in parallel, a second parallel circuit assembly, which is coupled to a lower potential of the current source and which has a plurality of switching elements connected in parallel, and a plurality of taps, which are each coupled to the first and second parallel circuit assemblies. Each switching element of the first and the second parallel circuit assemblies has two conducting connections and a control connection, which controls the flow of current from one conducting connection to the other conducting connection. The power converter also includes a control device, which is designed in such a way that, when the power converter is operated at partial load, at least one switching element of a parallel circuit assembly is controlled (Continued)

in such a way that said switching element is not switched on during at least one cycle. The switching elements of a parallel circuit assembly are thermally coupled to one another.

16 Claims, 3 Drawing Sheets

(51) Int. Cl.
  *H02M 7/493* (2007.01)
  *H02M 7/23* (2006.01)
  *H02M 7/5387* (2007.01)

(56) References Cited

U.S. PATENT DOCUMENTS

| | | |
|---|---|---|
| 2004/0252430 A1 | 12/2004 | Oumaru et al. |
| 2011/0194319 A1 | 8/2011 | Ishioka |
| 2012/0029741 A1 | 2/2012 | Gleason et al. |
| 2013/0279228 A1 | 10/2013 | Zhu et al. |
| 2014/0328102 A1* | 11/2014 | Wang ................ H02M 7/5387 363/132 |
| 2017/0302196 A1* | 10/2017 | Weng ................ H02M 7/5387 |
| 2018/0205309 A1* | 7/2018 | Bleus ................ H02M 1/08 |

FOREIGN PATENT DOCUMENTS

| | | |
|---|---|---|
| DE | 102 50 154 A1 | 5/2004 |
| DE | 102 50 155 A1 | 5/2004 |
| DE | 10 2004 006 753 A1 | 1/2005 |
| DE | 10 2009 017 753 A1 | 10/2010 |
| DE | 10 2011 108 495 A1 | 9/2012 |
| DE | 10 2012 013 938 A1 | 2/2013 |
| WO | WO-2016110429 A1 * | 7/2016 ............. H02M 3/07 |

OTHER PUBLICATIONS

German-language Written Opinion (PCT/ISA/237) issued in PCT Application No. PCT/EP2017/051703 dated Jun. 14, 2017 (five (5) pages).
German-language Search Report issued in counterpart German Application No. 10 2016 201 504.4 dated Mar. 3, 2016 with partial English translation (fifteen (15) pages).

* cited by examiner

POWER CONVERTER WITH REDUCED POWER LOSS

CROSS REFERENCE TO RELATED APPLICATIONS

This application is a continuation of PCT International Application No. PCT/EP2017/051703, filed Jan. 27, 2017, which claims priority under 35 U.S.C. § 119 from German Patent Application No. 10 2016 201 504.4, filed Feb. 1, 2016, the entire disclosures of which are herein expressly incorporated by reference.

BACKGROUND AND SUMMARY OF THE INVENTION

The present invention relates to an improved current converter for an electrically driven vehicle, in particular an improved inverter.

Inverters are used in electrically driven vehicles to convert the direct current from a rechargeable battery to a polyphase alternating current for driving an electric machine. The principles of electric drives are known to those skilled in the art and do not have to be described further here for the sake of conciseness.

Such current converters typically use three half-bridges, wherein two transistors are connected in series in each half-bridge. The transistors are coupled to one another at one terminal. The other terminals of the transistors are coupled to the positive potential and the negative potential of the current source. A winding of the electric machine is connected to a tap of the half-bridge. The tap of each half-bridge is located between the two series-connected transistors. A freewheeling diode is connected in parallel with each transistor. It is also possible for freewheeling diodes to be connected in parallel with each parallel circuit arrangement.

The application of such inverters in an electrically driven vehicle places high demands on the electronic components. Power transistors, for example MOSFET transistors, IGB transistors or the like, are used as electronic components.

To increase the power of the inverters, a plurality of power transistors are connected in parallel. Power losses arise during operation of the power transistors. On the one hand, power losses arise during the time for which the power transistor is switched on. These losses are caused substantially by the flow of current in a channel region of the transistor and the voltage dropped across said transistor. There are also switching losses, which arise when the transistor is switched on and off. Such current-independent switching losses arise due to the overlapping of a high current density and a high applied voltage at the transistor. The switching losses arise only during very short intervals in switch-on, during the increase in the flow of current, and in switch-off, during the reduction in the flow of current. In the case of an increasing switching frequency and, in particular, in the case of low currents, said switching losses have a substantial proportion of the total power loss.

In the prior art, the parallel-connected transistors are switched simultaneously, that is to say are modulated synchronously with respect to amplitude, frequency and pulse/interpulse ratio.

DE 40 05 168 A1 discloses a switching device for switching on and switching off at a high switching frequency for inverting an electrical variable in connection with a transformer or motor, wherein a driver for switching parallel-connected MOSFET semiconductors and IGBT power semiconductors is provided.

DE 102 50 155 A1 discloses a switched-mode power supply having a main switch and a standby switch to reduce losses in the standby mode.

DE 102 50 154 A1 discloses a switching unit for a switched-mode power supply in which a main switch and a standby switch connected in parallel with one another are provided.

DE 10 2012 013 938 A1 discloses a transmitter head and a system for contactless energy transmission, which has parallel-connected half-bridges, wherein each half-bridge is formed from a series circuit of actuable semiconductor switches.

JP-11150951 discloses an apparatus for modulating the voltage that is output at a load, wherein the apparatus has two parallel-connected modulation bridges controlled by a control module.

JP-07007935 discloses two parallel-connected switches at a rectifier-transducer circuit. First, a second switching transistor is actuated at a comparatively low input voltage. If the output voltage of the circuit exceeds a specific prescribed value, the first switching transistor is actuated.

DE 10 2013 2012 012 A1 relates to a converter having a plurality of parallel-connected central elements, wherein each central element has at least one half-bridge.

DE 693 15 903 T2 discloses that, in a plurality of parallel-connected transistors of a bridge for actuating an electric motor, the transistors are switched on at different times to reduce parasitic effects.

The invention is based on the object of providing an improved current converter, in particular of providing a current converter having a reduced power loss.

This and other objects of the invention are achieved by a current converter, an inverter, and/or an electric drive in accordance with embodiments of the invention.

The current converter according to the invention is configured to convert a DC voltage of a current source to an AC voltage and/or to convert an AC voltage to a DC voltage. The current converter includes a bridge circuit and a control device. The bridge circuit includes a first parallel circuit arrangement coupled to a higher potential of the current source and a second parallel circuit arrangement coupled to a lower potential of the current source.

The bridge circuit includes a plurality of taps, which are each coupled to the first and the second parallel circuit. Each switching element of the first parallel circuit arrangement and the second parallel circuit arrangement includes two line terminals and one control terminal that controls the flow of current from one line terminal to the other line terminal. The control device is configured, in the case of part load, to actuate at least one switching device of a parallel circuit arrangement in such a way that it is not switched on during a cycle. The switching elements of a parallel circuit arrangement are thermally coupled to one another.

A cycle corresponds to a period of an AC voltage signal. The AC voltage signal can be generated by the current converter and can be output at the taps. However, it is also possible for the AC voltage signal to be applied to the taps. Since at least one switching element is not switched on during at least one cycle, the switching losses and hence the power loss can be reduced. Since the switching elements of a parallel circuit arrangement are thermally coupled to one another, a more uniform current distribution across the switching elements can be achieved independently of the operating point.

The switching elements of a parallel circuit arrangement can be thermally coupled to one another in such a way that heat flows from one switching element of a parallel circuit arrangement to another switching element of the parallel circuit arrangement. The flow of heat can cause the temperature difference between two switching elements of the parallel circuit arrangement during operation to be lower than in the case of two separate (i.e., not thermally coupled) switching elements, in one embodiment, for example, to be lower than approximately 5° C., preferably lower than approximately 2.5° C., more preferably lower than approximately 1° C.

The control device can be configured in such a way that, when the current transducer is operated at part load, a greater number of switching elements of the parallel circuit arrangements are actuated in such a way that they are switched on during a cycle, the greater the load is. Since the number of switching elements that are switched on during a cycle depends on the load, the switching losses can be reduced, since as few switching elements are switched on as necessary. Conversely, fewer switching elements are switched on during a cycle, the lower the load is.

The control device can be configured in such a way that, in the event of part load, the number of switching elements of the parallel circuit arrangements that are actuated in such a way that they are switched on during a cycle are selected in such a way that at least one switching device that is switched on during a cycle is located in each case as close as possible to the range of the highest power output or current output. The less switching devices have to be switched on and off during a cycle, the lower the switching losses are. The control device can be configured in such a way that, in the event of part load, the number of switching elements of the parallel circuit arrangements that are actuated in such a way that they are switched on during a cycle is selected in such a way that at least one switching device that is switched on during a cycle is located in each case as close as possible to the range of the highest efficiency, which comprises the highest efficiency.

The range of the highest power output or current output of a switching element when the current transducer is operated at part load can substantially correspond to the range of the maximum power output or current output when the current transducer is operated at full load.

A plurality of the switching elements of the first parallel circuit arrangement or the second parallel circuit arrangement can be arranged on a chip and/or on a substrate. Particularly good thermal coupling is achieved as a result. For example, the substrate can be a ceramic substrate and the transistors can be arranged on the substrate by way of so-called chip-on-board technology (chip on the substrate). However, it is also possible for a plurality of the switching elements of the first parallel circuit arrangement or the second parallel circuit arrangement to be arranged in a common housing without a lower housing. Good heat transmission and thus more uniform current distribution can be achieved as a result.

The current converter can include a half-bridge having a series circuit composed of the first parallel circuit arrangement and the second parallel circuit arrangement, wherein a plurality of the switching elements of the parallel circuit arrangements are located on a chip and/or on a substrate. The series circuit composed of the first parallel circuit arrangement and the second parallel circuit arrangement can be located in a housing without a lower housing. Better thermal coupling between the switching elements can be achieved as a result, which leads to a more uniform division of the flow of current across the switching elements.

The switching elements can have a transistor, a bipolar transistor, a FET transistor, a MOSFET transistor and/or an IGB transistor. It is preferable for all the parallel circuit arrangements to have the same type of switching element.

A freewheeling diode can be connected in parallel with each of the parallel circuit arrangements. The freewheeling diode protects the switching element against currents and voltages from the coil of the electric machine when the switching device is switched off.

The invention also discloses an inverter including the current converter described above.

The invention also relates to an electric drive including the inverter, wherein at least one winding of an electric machine is connected to a tap of the inverter.

Compared to the prior art, while it is in part load operation, the current converter according to the invention switches fewer transistors of each parallel circuit arrangement on and off during a cycle. The power loss can be reduced and the efficiency can be increased as a result. In full load operation, all the transistors of a parallel circuit arrangement are switched on during a cycle. The power loss can therefore be reduced without restricting the functionality. In this exemplary embodiment, the invention further requires just one comparatively small modification of the control device, since the switching frequencies and the switching times are not changed compared to a conventional current converter. In comparison to a conventional current converter, only the number of transistors switched on during a cycle has to be changed depending on the desired amplitude of the alternating current generated.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
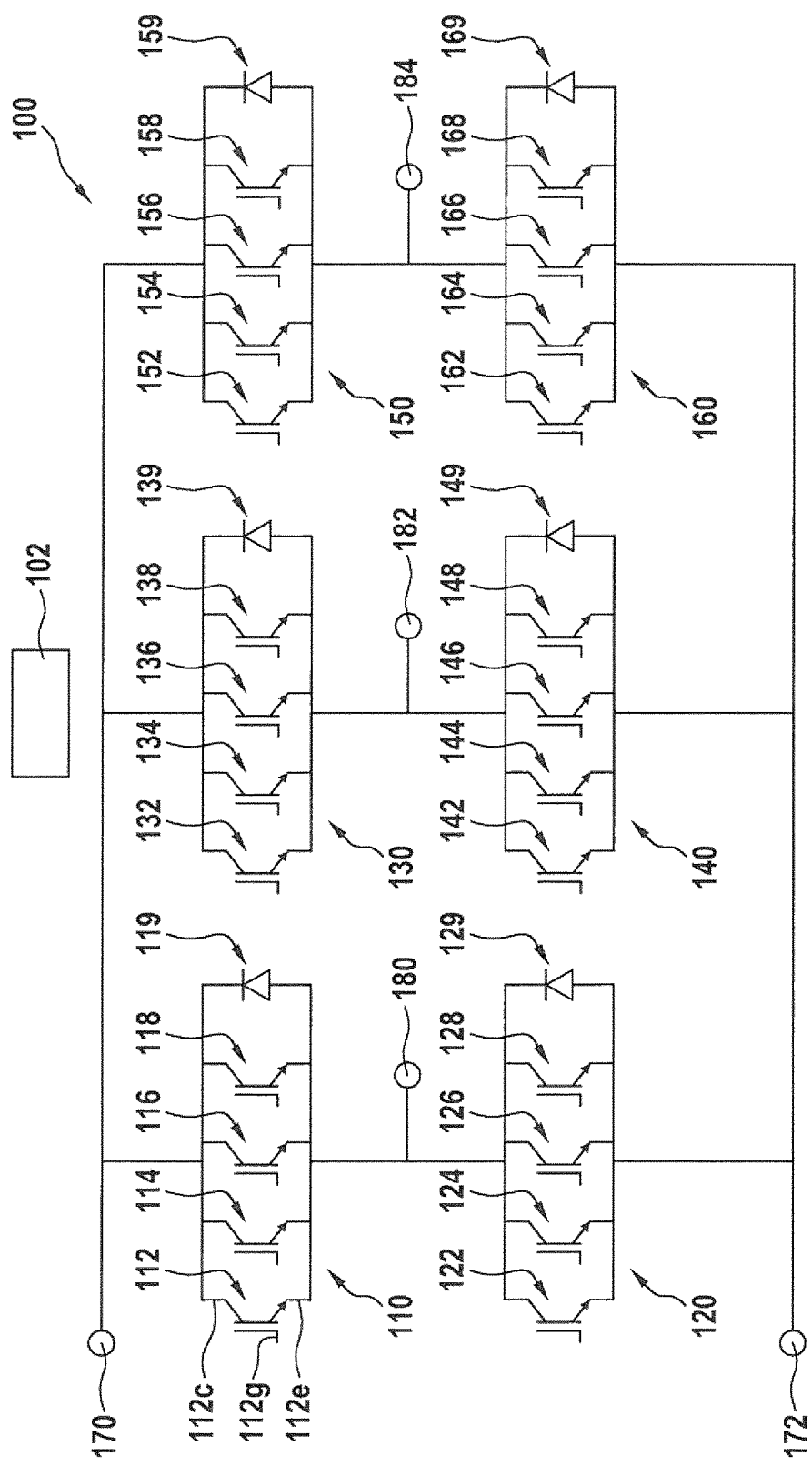
FIG. 1 is a circuit diagram of a current converter according to an embodiment of the invention.

FIG. 1 shows a schematic diagram of a current converter 100 according to an embodiment of the invention. A rechargeable battery is connected to terminals 170 and 172, for example via a link circuit store and a DC/DC converter, or a DC link circuit. A phase of the three-phase current, for example in each case a winding of an electric machine for driving a vehicle, can be connected to the taps 180, 182, 184. The current converter 100 functions as an inverter or a controlled or regulated rectifier.

The current converter 100 includes one or more half-bridges and, in the example shown in the figures, three half-bridges. The first half-bridge is formed by the series circuit of a first parallel circuit arrangement 110 having a plurality of transistors 112, 114, 116, 118 and a second parallel circuit arrangement 120 having a plurality of parallel-connected transistors 122, 124, 126, 128. A freewheeling diode 119, 129 is connected in parallel with each parallel circuit arrangement of the first half-bridge. The second half-bridge is formed by the series circuit composed of the third parallel circuit arrangement 130 having a plurality of parallel-connected transistors 132, 134, 136, 138 and the fourth parallel circuit arrangement 140 having a plurality of parallel-connected transistors 142, 144, 146, 148. A freewheeling diode 139, 149 is connected in parallel with each parallel circuit arrangement of the second half-bridge. A third half-bridge includes a fifth parallel circuit arrangement 150 having a plurality of parallel-connected transistors 152, 154, 156, 158 and a sixth parallel circuit arrangement 160 having a plurality of parallel-connected transistors 162, 164, 166, 168. A freewheeling diode 159, 169 is connected in parallel with each parallel circuit arrangement of the third half-bridge.

Figure 3:
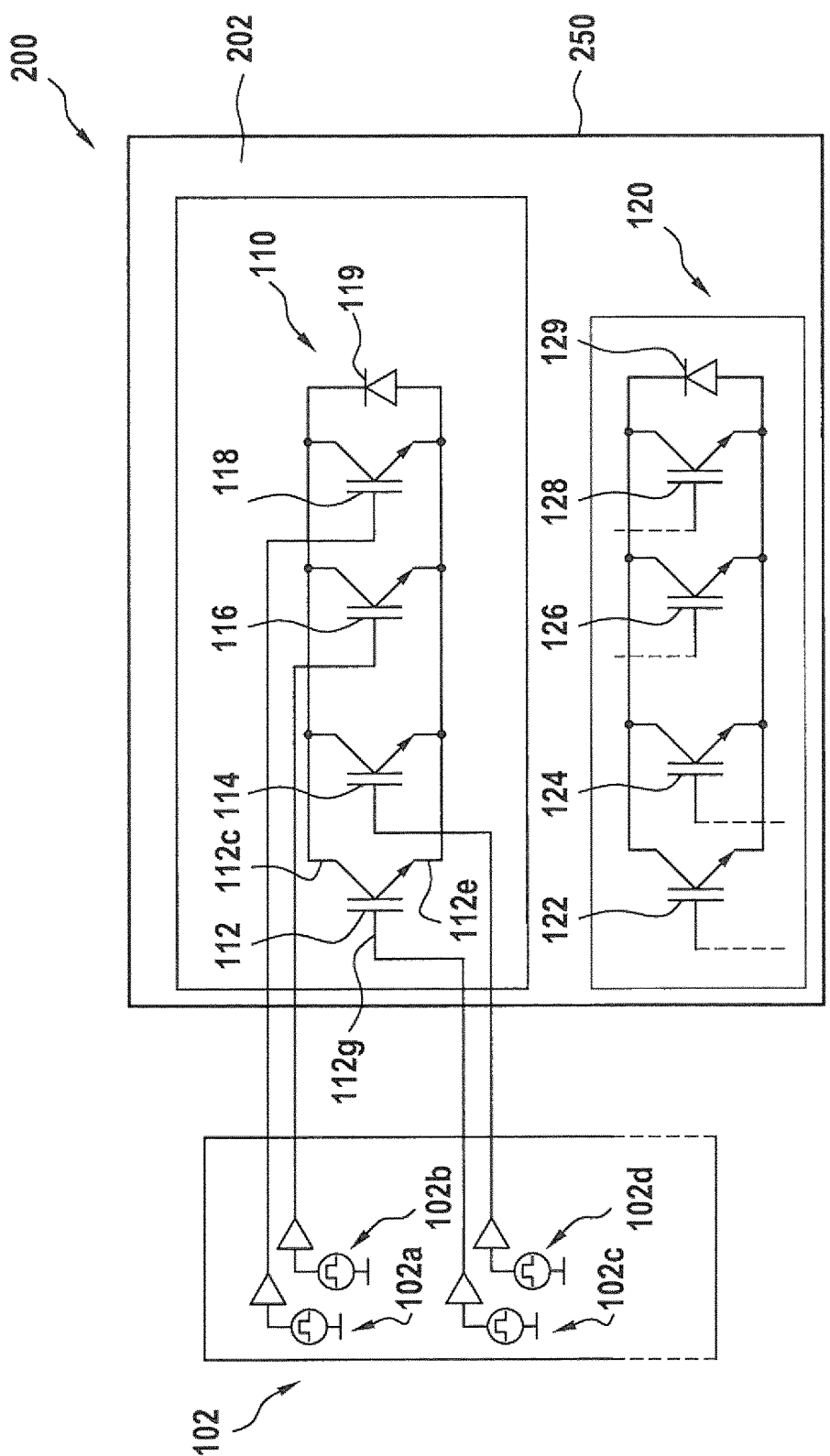
FIG. 3 is a schematic illustration of a parallel circuit arrangement.

In the embodiment illustrated in FIG. 1, the transistors 112 to 168 are so-called IGB transistors (insulated-gate bipolar transistors). FIG. 3 shows a section from FIG. 1 in which the actuation is examined in more detail. Each transistor 112 to 168 includes a gate 112g, a collector 112c, and an emitter 112e. The signal at the gate essentially controls the current between the collector and the emitter. A control device 102 controls the gate electrodes of the transistors 112 to 168 in such a way that either no potential or the higher potential of the supply voltage fed in via the terminal 170 or the lower potential of the supply voltage fed in via the terminal 172 is applied to the taps 180, 182, 184. The pulse width of the pulse applied to the gate electrode 112g can control the power supplied to a tap 180, 182, 184. The pulses can be applied to the respective gate electrode 112g multiple times within a cycle. A cycle corresponds to a period of an AC signal generated by the current converter 100. The period and the frequency of the AC signal depend on the present rotational speed of a shaft of an electric machine. The operation of inverters is otherwise known to those skilled in the art and does not have to be described further here.

In the embodiment of the current converter 100 shown in FIG. 1, each parallel circuit arrangement 110, 120, 130, 140, 150, 160 includes four parallel-connected transistors. The number of parallel-connected transistors can be selected depending on the dimensioning (maximum load) of the current converter 100.

The number of parallel-connected transistors that are switched on during a cycle depends on the load. At full load, all the transistors of a parallel circuit arrangement are switched on. At low load, only some of the parallel-connected transistors are switched on during a cycle. Those parallel-connected transistors that are switched on during a cycle are switched on and off synchronously.

Figure 2:
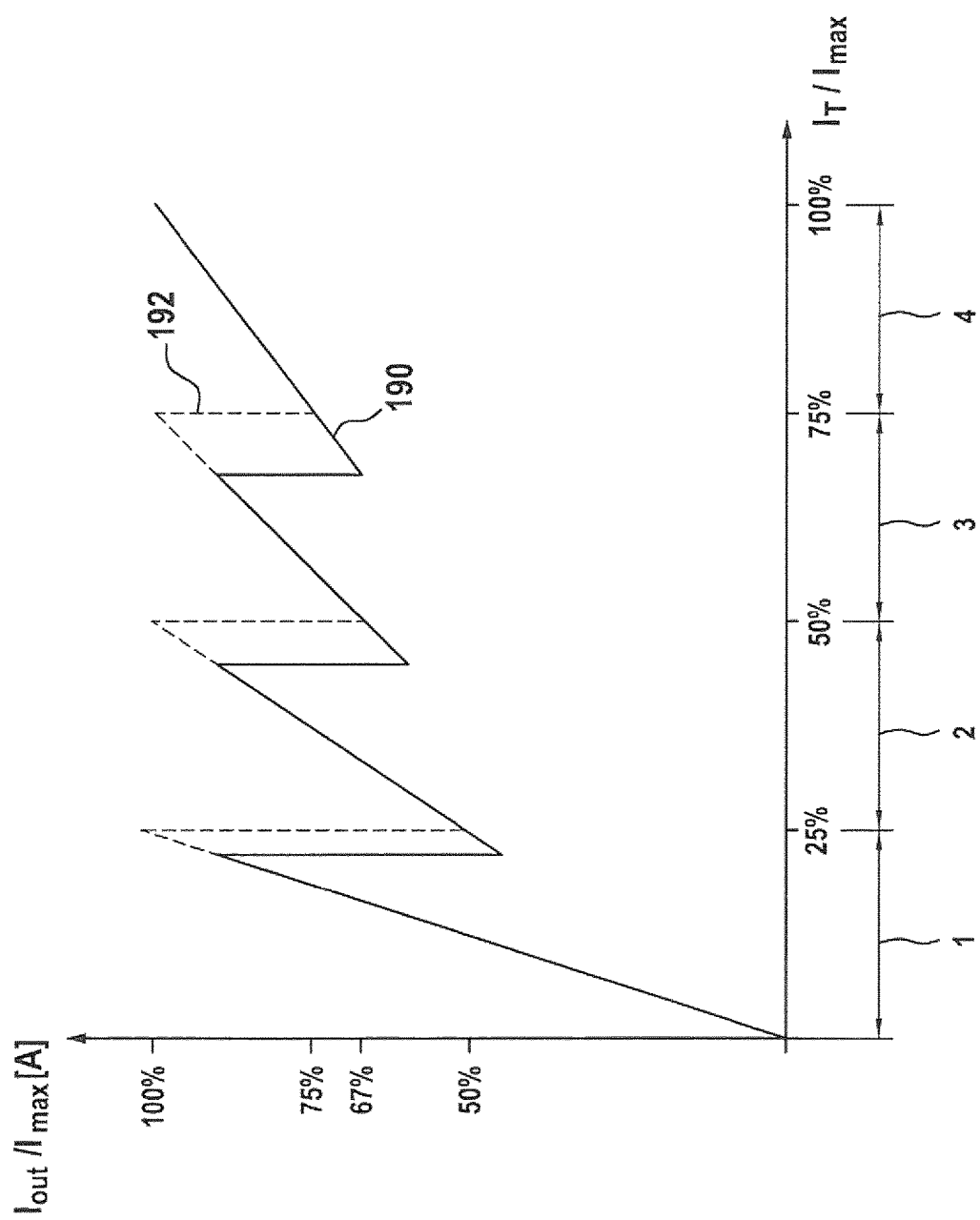
FIG. 2 is a graph illustrating how many transistors are actuated or loaded at a corresponding load as a function of the current that is output.

The principle operation of the control device 102 during actuation of the transistors is explained with reference to FIG. 2. The quotient of the present current intensity and the maximum current intensity of all the activated transistors is plotted on the horizontal axis. The quotient of the present current and the maximum current of a switched-on transistor is plotted on the vertical axis.

In a range 1 in which less than approximately a quarter of the maximum current is requested by the current converter 100, only one transistor of one parallel circuit arrangement 110, 120, 130, 140, 150, 160 is switched on. As soon as more than approximately 25% and less than approximately 50% of the maximum current is to be generated by the current converter 100, two transistors of each parallel circuit arrangement are switched on and off synchronously (range 2). Said two transistors are each operated at at least approximately 50% of the maximum load to approximately 100% of their maximum load in order to generate an alternating current between approximately 25% to approximately 50% of the maximum current. If more than approximately 50% and less than approximately 75% of the maximum current is to be delivered by the current converter 100 (range 3), three transistors of each parallel circuit arrangement have to be switched on and off synchronously. The three transistors of each parallel circuit arrangement are operated at approximately 66.67% of their maximum load up to approximately 100% of their maximum load in order that the current converter can deliver approximately 50% to approximately 75% of the maximum current. If more than approximately 75% of the maximum current is to be delivered by the current converter 100 (range 4), four transistors of each parallel circuit arrangement 110, 120, 130, 140, 150, 160 are switched on and off during a cycle. If the current converter 100 is intended to deliver between approximately 75% and approximately 100% of the maximum current, the four synchronously actuated transistors of each parallel circuit arrangement are on load between 75% and 100% of their maximum load. This operation of the control device can ensure that as few transistors as possible are switched on and off during a cycle at each operating point. This gives the curve 192 in FIG. 2. The switching losses can be reduced as a result. By taking the forward losses into account, switchover points can be optimized with respect to the total losses of the current converter 100, which is illustrated by the curve 190 in FIG. 2.

Reference is made to FIG. 3, which shows an arrangement of a half-bridge 200 on a substrate 202. The half-bridge 200 includes a first parallel circuit arrangement 110 having the parallel-connected transistors 112, 114, 116, 118. The second parallel circuit arrangement 120 includes parallel-connected transistors 122, 124, 126, 128. The transistors 112, 114, 116, 118, 122, 124, 126, 128 are mounted on a ceramic substrate 202 (chip-on-board). The terminals of the transistors 122 to 128 are connected to the substrate 202, for example by way of bonding technology. This can ensure that all the transistors have substantially the same temperature, since the substrate 202 ensures good thermal coupling.

The parallel circuit arrangements 110 and 120 are located in a housing 250 without a further lower housing or isolating housing element. The individual transistors 112-128 of the parallel circuit arrangements 110 and 120 are therefore not separated by a housing element. This can again ensure that all the transistors 112 to 226 have substantially the same temperature.

The control device 102 includes a first control element 102a, which controls the transistor 112, a second control element 102b, which controls the transistor 114, a third control element 102c, which controls the transistor 116, and a fourth control element 102d, which controls the transistor 118.

The present invention has the advantage that the power loss of a current converter is reduced without restricting the functionality by virtue of the switching losses being reduced.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A current converter, which is configured to convert a direct current of a current source to an alternating current and/or to convert an alternating current to a direct current, comprising:

a bridge circuit including
a first parallel circuit arrangement having a plurality of parallel-connected switching elements, the first parallel circuit arrangement being coupled to a higher potential of the current source,
a second parallel circuit arrangement having a plurality of parallel-connected switching elements, the second parallel circuit arrangement being coupled to a lower potential of the current source, and
a plurality of taps, which are each coupled to the first parallel circuit arrangement and second parallel circuit arrangement,
wherein each switching element of the first parallel circuit arrangement and the second parallel circuit arrangement has two line terminals and one control terminal that controls a flow of current from one line terminal to the other line terminal; and
a control device, which is configured such that
when a current transducer is operated at part load, at least one switching element of the first and second parallel circuit arrangements is actuated in such a way that the at least one switching element is not switched on during at least one cycle,
wherein the switching elements of at least one of the first and second parallel circuit arrangements are thermally coupled to one another in such a way that heat flows from one switching element of the at least one of the first and second parallel circuit arrangements to another switching element of the at least one of the first and second parallel circuit arrangements.

2. The current converter according to claim 1, wherein the control device is configured in such a way that, when the current transducer is operated at part load, a greater number of switching elements of the first and second parallel circuit arrangements are actuated in such a way that they are switched on during a cycle, the greater the load is.

3. The current converter according to claim 2, wherein the control device is configured in such a way that, when the current converter is operated at part load, a number of switching elements of the parallel circuit arrangements that are actuated in such a way that they are switched on during a cycle are selected in such a way that at least one switching device that is switched on during a cycle is located in each case as close as possible to a range of the highest power output.

4. The current converter according to claim 2, wherein the control device is configured in such a way that, when the current transducer is operated at part load, a number of switching elements of the first and second parallel circuit arrangements that are actuated in such a way that they are switched on during a cycle are selected in such a way that at least one switching device that is switched on during a cycle is located in each case as close as possible to a range of the highest efficiency.

5. The current converter according to claim 4, wherein a plurality of the switching elements of the first parallel circuit arrangements or of the second parallel circuit arrangements are located on a substrate.

6. The current converter according to claim 5, wherein the current converter includes a half-bridge having a series circuit composed of the first parallel circuit arrangement and of the second parallel circuit arrangement, and
a plurality of the switching elements of the first and second parallel circuit arrangements are located on a substrate.

7. The current converter according to claim 6, wherein the switching elements each have at least one of the following:
a transistor;
a bipolar transistor;
a FET transistor;
a MOSFET transistor; and
an IGBT transistor.

8. The current converter according to claim 6, wherein a freewheeling diode is connected in parallel with each of the first and second parallel circuit arrangements.

9. The current converter according to claim 1, wherein the control device is configured in such a way that, when the current converter is operated at part load, a number of switching elements of the parallel circuit arrangements that are actuated in such a way that they are switched on during a cycle are selected in such a way that at least one switching device that is switched on during a cycle is located in each case as close as possible to a range of the highest power output.

10. The current converter according to claim 1, wherein the control device is configured in such a way that, when the current transducer is operated at part load, a number of switching elements of the first and second parallel circuit arrangements that are actuated in such a way that they are switched on during a cycle are selected in such a way that at least one switching device that is switched on during a cycle is located in each case as close as possible to a range of the highest efficiency.

11. The current converter according to claim 1, wherein a plurality of the switching elements of the first parallel circuit arrangements or of the second parallel circuit arrangements are located on a substrate.

12. The current converter according to claim 1, wherein
the current converter includes a half-bridge having a series circuit composed of the first parallel circuit arrangement and of the second parallel circuit arrangement, and
a plurality of the switching elements of the first and second parallel circuit arrangements are located on a substrate.

13. The current converter according to claim 1, wherein the switching elements each have at least one of the following:
a transistor;
a bipolar transistor;
a FET transistor;
a MOSFET transistor; and
an IGBT transistor.

14. The current converter according to claim 1, wherein a freewheeling diode is connected in parallel with each of the first and second parallel circuit arrangements.

15. An inverter, comprising:
a current converter according to claim 1.

16. An electric drive, comprising:
an inverter according to claim 15, wherein at least one winding of an electric machine is connected to a tap of the inverter.

* * * * *